United States Patent
Morishita et al.

(10) Patent No.: US 6,582,483 B2
(45) Date of Patent: Jun. 24, 2003

(54) METHOD FOR MANUFACTURING POSITIVE ELECTRODE FOR ALKALINE STORAGE BATTERY

(75) Inventors: Nobuyasu Morishita, Aichi (JP); Kazuyuki Kusama, Aichi (JP); Satoshi Uda, Aichi (JP); Munehisa Ikoma, Nara (JP)

(73) Assignees: Matsushita Electric Industrial Co., Ltd., Osaka (JP); Toyota Jidosha Kabushiki Kaisha, Osaka (JP)

( * ) Notice: Subject to any disclaimer, the term of this patent is extended or adjusted under 35 U.S.C. 154(b) by 255 days.

(21) Appl. No.: 09/851,288

(22) Filed: May 8, 2001

(65) Prior Publication Data

US 2002/0012847 A1 Jan. 31, 2002

(30) Foreign Application Priority Data

May 10, 2000 (JP) ......................... 2000-137295

(51) Int. Cl.$^7$ .......................... H01M 6/00; H01M 4/64; H01M 4/68; B23P 13/00
(52) U.S. Cl. ........................... 29/623.5; 29/2; 429/233; 429/245
(58) Field of Search ........................ 29/2, 623.1, 623.5; 429/233, 235, 245

(56) References Cited

FOREIGN PATENT DOCUMENTS

| JP | 10-106586 | 4/1998 |
| JP | 10-106587 | 4/1998 |

*Primary Examiner*—Patrick Ryan
*Assistant Examiner*—Thomas H. Parsons
(74) *Attorney, Agent, or Firm*—Merchant & Gould P.C.

(57) ABSTRACT

A method for manufacturing a positive electrode for an alkaline storage battery that achieves excellent filing characteristics for an active material for the positive electrode and longer lifetime of the battery is provided. The method includes a first process of filling a paste of the active material for the positive electrode in a first porous metal sheet provided with a plurality of oblate pores whose major axes are arranged substantially in one direction, and a second process of pressing the first porous metal sheet that has undergone the first process using a roller press such that the one direction and a direction of a rotation axis of a roller in the roller press substantially are parallel, so as to produce a positive electrode sheet provided with a second porous metal sheet. In the second porous metal sheet, a value obtained by dividing a length of the pores in the one direction by that of the pores in a direction perpendicular to the one direction and parallel to a surface of the second porous metal sheet averages in the range of 0.9 to 1.1.

5 Claims, 5 Drawing Sheets

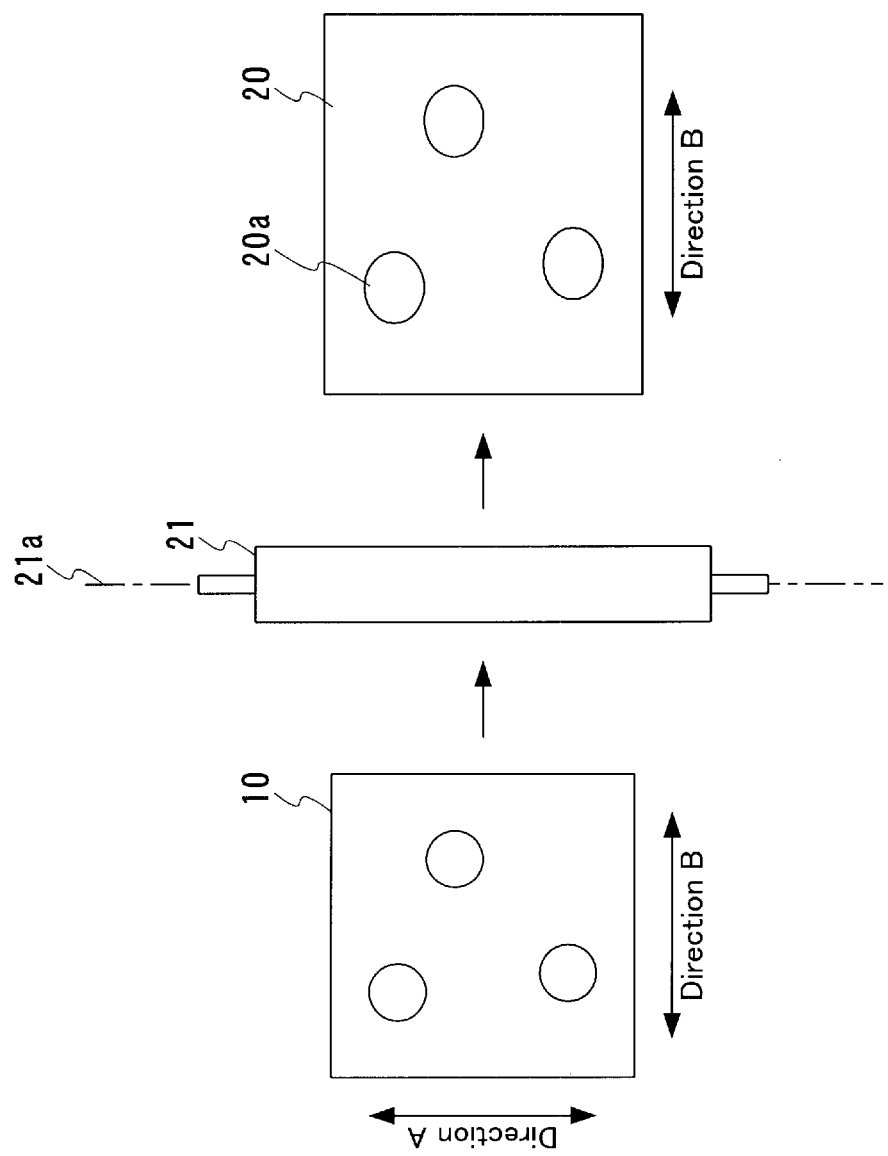

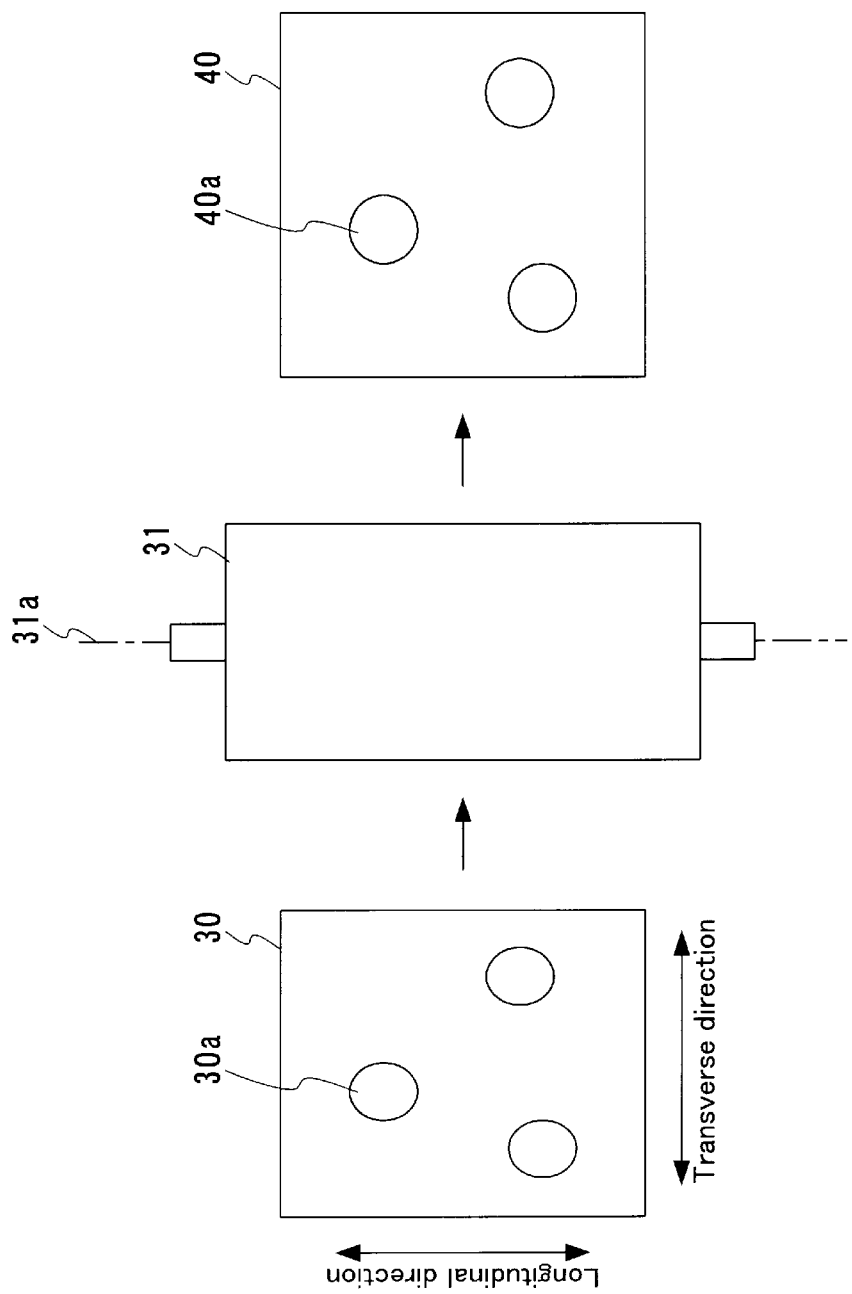

US 6,582,483 B2

METHOD FOR MANUFACTURING POSITIVE ELECTRODE FOR ALKALINE STORAGE BATTERY

BACKGROUND OF THE INVENTION

1. Field of the Invention

The present invention relates to a method for manufacturing positive electrodes for alkaline storage batteries.

2. Description of Related Art

In recent years, alkaline storage batteries have attracted wide attention as a power source for portable equipment and those of electric cars or hybrid electric vehicles. Accordingly, the demand for higher performance of the alkaline storage batteries has been intensified. In particular, nickel metal-hydride secondary batteries provided with positive electrodes using nickel hydroxide and negative electrodes using hydrogen absorbing alloy rapidly have become widespread as a secondary battery with a high energy density and excellent reliability.

As the positive electrodes for the alkaline storage batteries, electrode plates obtained by filling a porous metal sheet with an active material for the positive electrode that contains nickel hydroxide particles as the main component are used. The thickness of these electrode plates can be adjusted by pressing with a roller press after filling the porous metal sheet with a paste of the active material.

In the positive electrodes for the alkaline storage batteries, it is effective that pores in the porous metal sheet, in which the active material is filled, are substantially spherical, in terms of extending lifetime and improving filling characteristics of the active material. However, the conventional positive electrodes described above have had a problem that the oblateness of the pores in the porous metal sheet increases when being pressed with the roller press.

SUMMARY OF THE INVENTION

With the foregoing in mind, it is an object of the present invention to provide a method for manufacturing a positive electrode for an alkaline storage battery that achieves excellent filling characteristics for an active material for the positive electrode and longer lifetime of the battery.

In order to achieve the above-mentioned object, a method for manufacturing a positive electrode for an alkaline storage battery of the present invention includes a first process of filling a paste of an active material for the positive electrode in a first porous metal sheet provided with a plurality of oblate pores whose major axes arranged substantially in one direction, and a second process of pressing the first porous metal sheet that has undergone the first process using a roller press such that the one direction and a direction of a rotation axis of a roller in the roller press substantially are parallel, so as to produce a positive electrode sheet provided with a second porous metal sheet. In the second porous metal sheet, a value obtained by dividing a length of the pores in the one direction by that of the pores in a direction perpendicular to the one direction and parallel to a surface of the second porous metal sheet averages in the range of 0.9 to 1.1. In the above manufacturing method, a ratio of length and breadth of the pores in the porous metal sheet contained in the positive electrode is 1 or close to 1. Thus, in the alkaline storage battery using the positive electrode that is manufactured by the above manufacturing method, a reaction during charging and discharging occurs in a substantially uniform manner, achieving a longer lifetime. Also, the filling characteristics of the active material improve in the positive electrode that is manufactured by the above manufacturing method.

The above manufacturing method further may include a preparatory process of producing the first porous metal sheet by pressing a porous metal sheet provided with a plurality of pores using a roller press before the first process. According to the above embodiment, the first porous metal sheets provided with the pores of various shapes can be formed by changing a pressing condition in the preparatory process and the porous metal sheet to be used. Therefore, this embodiment reduces the restriction of the conditions in the first and second processes.

In the above manufacturing method, in the second process, the first porous metal sheet may pass through the roller press after being rotated substantially by 90° around an axis perpendicular to a principal plane of the first porous metal sheet from a direction in which the porous metal sheet has passed through the roller press in the preparatory process. This embodiment makes it easier to implement the manufacturing method of the present invention. In the present invention, "being rotated substantially by 90°" means that longitudinal and transverse directions of the sheet are exchanged with each other.

In the above manufacturing method, the porous metal sheet may be formed of nickel.

In the above manufacturing method, the paste of the active material may contain nickel hydroxide.

The pressing process in the preparatory process and the second process may be carried out one time or a plurality of times.

BRIEF DESCRIPTION OF THE DRAWINGS

FIG. 2 is a schematic view showing one example of the manufacturing process in the manufacturing method of the present invention.

FIG. 3 is a schematic view showing another example of the manufacturing process in the manufacturing method of the present invention.

DESCRIPTION OF THE PREFERRED EMBODIMENTS

Figure 1A:
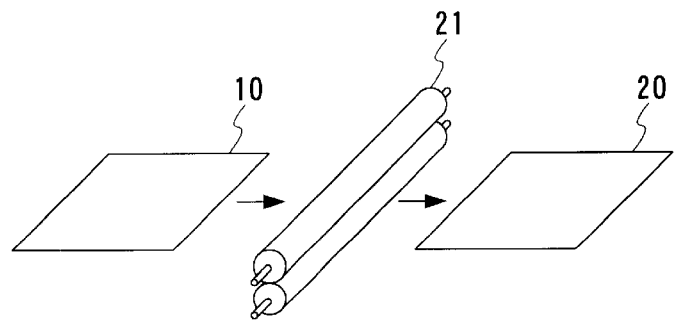
FIGS. 1A and 1B are perspective views schematically showing manufacturing processes in a manufacturing method of the present invention.

The following is a description of an embodiment of the present invention. The following embodiment simply is an example of a manufacturing method of the present invention and does not limit the present invention.

In the method for manufacturing a positive electrode for an alkaline storage battery of the present invention, first, a paste of an active material for the positive electrode is filled in a porous metal sheet (a first porous metal sheet) provided with a plurality of pores with their major axes arranged substantially in one direction (which may be referred to as a direction D or a longitudinal direction in the following) (a first process). For example, a nickel foam can be used as the first porous metal sheet. A paste containing nickel hydroxide as a main component can be used as the active material paste.

Subsequently, the first porous metal sheet that has undergone the first process is pressed using a roller press such that the direction D and a direction of a rotation axis of a roller in the roller press substantially are parallel, thereby producing a positive electrode sheet provided with a second porous metal sheet (a second process). In the second process, the pores in the first porous metal sheet are deformed. In the second porous metal sheet formed in the second process, a value obtained by dividing the pore length in the direction D by the pore length in the direction perpendicular to the direction D and parallel to a surface of the second porous metal sheet (which may be referred to as a transverse direction in the following) averages in the range of 0.9 to 1.1.

Then, the positive electrode sheet is cut in a predetermined size, thus producing a positive electrode. Between the above processes, a process of welding a lead (a collector) to the porous metal sheet further is included.

The first porous metal sheet used in the first process contains a plurality of pores whose major axes are arranged substantially in one direction. The cross-section of these pores along a plane parallel to a principal plane of the porous metal sheet substantially is elliptical. Also, the value obtained by dividing the pore length in the longitudinal direction by that in the transverse direction (which may be referred to as a ratio of length and breadth in the following) averages, for example, approximately 1.3 to 1.5. The preferable ratio of length and breadth varies depending on the condition used for rolling in the second process.

The first porous metal sheet used in the first process described above can be produced, for example, by pressing a porous metal sheet provided with a plurality of pores with a roller press (a preparatory process). In this process, the ratio of length and breadth of the pores can be changed by adjusting the condition of the roller press.

As the active material for the positive electrode used in the first process described above, a material used generally for alkaline storage batteries can be used. Specifically, it is possible to use nickel hydroxide particles to which, for example, cobalt is added.

The roller diameter of the roller press used in the preparatory process described above is, for example, in the range of 50 mm to 1000 mm.

In the second process described above, it is preferable that the first porous metal sheet is pressed after being rotated substantially by 90° from a pressing direction in the preparatory process. In other words, it is preferable that the first porous metal sheet passes through the roller press after being rotated substantially by 90° around an axis perpendicular to the principal plane of the first porous metal sheet from the direction in which the porous metal sheet has passed through the roller press in the preparatory process.

The roller diameter of the roller press used in the second process described above is, for example, in the range of 50 mm to 1000 mm, preferably in the range of 500 mm to 1000 mm. Since the pores need to be elongated to achieve an optimal ratio of length and breadth in the preparatory process, the roller diameter of the roller press used in this process is adjusted according to how the porous metal sheet is extended. In the second process, the roller press having a relatively large roller diameter is used in order to prevent the porous metal sheet from breaking.

In the above manufacturing method, it is possible to manufacture the positive electrode including the porous metal sheet provided with the pores having a ratio of length and breadth of 0.9 to 1.1 and the active material for the positive electrode that is filled in the porous metal sheet. Thus, according to the above manufacturing method, it is possible to manufacture the positive electrode for the alkaline storage battery that achieves excellent filling characteristics of the active material for the positive electrode and longer lifetime of the battery. According to the above manufacturing method, it also is possible to manufacture the positive electrode having the excellent filling characteristics for the active material for the positive electrode. Furthermore, in the above manufacturing method, by adjusting the conditions in the preparatory process, the shape of the first porous metal sheet can be changed, thereby controlling an amount of the active material for the positive electrode to be filled in the first process easily. Moreover, in the above manufacturing method, by adjusting the conditions in the preparatory process and the second process, the shape of the positive electrode sheet to be obtained can be changed, thereby controlling a balance between an output and a capacity of the alkaline storage battery using this positive electrode easily.

EXAMPLE

In the following, the present invention will be described more specifically by way of an example.

First, a porous metal sheet 10 (a nickel foam sheet) was prepared. The porous metal sheet 10 had a thickness of 2.0 mm and a porosity of 97%, and its pores had a ratio of length and breadth of approximately 1.0. As shown in FIG. 1A, this porous metal sheet 10 was pressed using a roller press, thus forming a porous metal sheet 20 (a preparatory process). The pressing condition was as follows. The diameter of a roller 21 was 100 mm, the pressure was 3920 N/cm$^2$ (400 kgf/cm$^2$), the clearance was 1.0 mm, and the pressing speed was 10 m/min. FIG. 2 schematically shows the shape of the pores in the porous metal sheets 10 and 20 before and after the roller pressing. FIGS. 2 and 3 are schematic drawings, while, in the actual porous metal sheets, the pores were formed like a sponge. As shown in FIG. 2, when the direction parallel to a rotation axis 21a of the roller 21 in the roller press was referred to as a direction A of the porous metal sheets 10 and 20, the porous metal sheet 10 was rolled mainly in a direction B that is perpendicular to the direction A. Thus, pores 20a in the porous metal sheet 20 had been elongated in the direction B to have an oblate shape. In this case, a value obtained by dividing the diameter of the pores 20a in the direction A by that in the direction B averaged about 0.7. In other words, the ratio of length and breadth of the pores 20a was about 1.4 (a reciprocal of 0.7). It was possible to calculate the above-mentioned value from a ratio of length and breadth of electrical resistance because the pore shape is reflected in the electrical resistance. A specific calculation method will be described below.

Subsequently, a paste of an active material for a positive electrode was filled in the porous metal sheet 20 that had undergone the preparatory process, followed by drying, thus obtaining a porous metal sheet 30 (a first process). As the active material paste, nickel hydroxide was used as the main component. The filling amount was 19.0 g to 21.0 g per sheet. The active material paste was filled in the pores 20a of the porous metal sheet 20 by being fed from above and below the sheet (a horizontal filling).

Figure 1B:
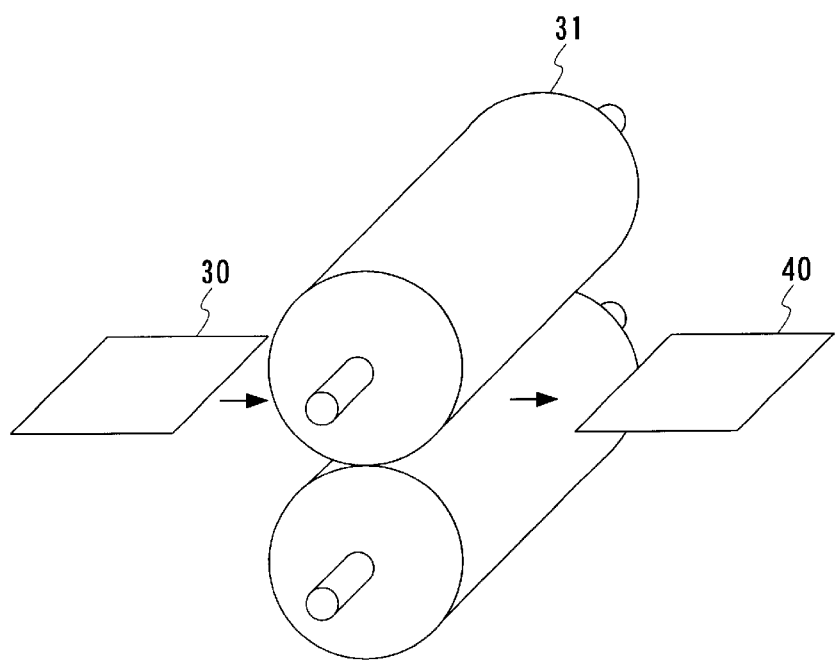

Then, as shown in FIG. 1B, the porous metal sheet 30 was rolled again using a roller press, thus obtaining a positive electrode sheet 40 (a second process). The pressing condition at this time was as follows. The diameter of a roller was 800 mm, the pressure was 2940 N/cm² (300 kgf/cm²), the clearance was 0.5 mm, and the press speed was 10 m/min. FIG. 3 schematically shows the second process. In this process, the porous metal sheet 30 passed through the roller press after being rotated substantially by 90° around an axis perpendicular to a principal plane of the porous metal sheet 30 from the direction in which the porous metal sheet 10 had passed through the roller press in the preparatory process (the direction B in FIG. 2 becomes a longitudinal direction in FIG. 3). The ratio of length and breadth of pores 40*a* in the porous metal sheet in the positive electrode sheet 40 averaged about 1.0.

The positive electrode sheet was cut in a predetermined size afterwards, thereby obtaining a positive electrode.

Figure 4:
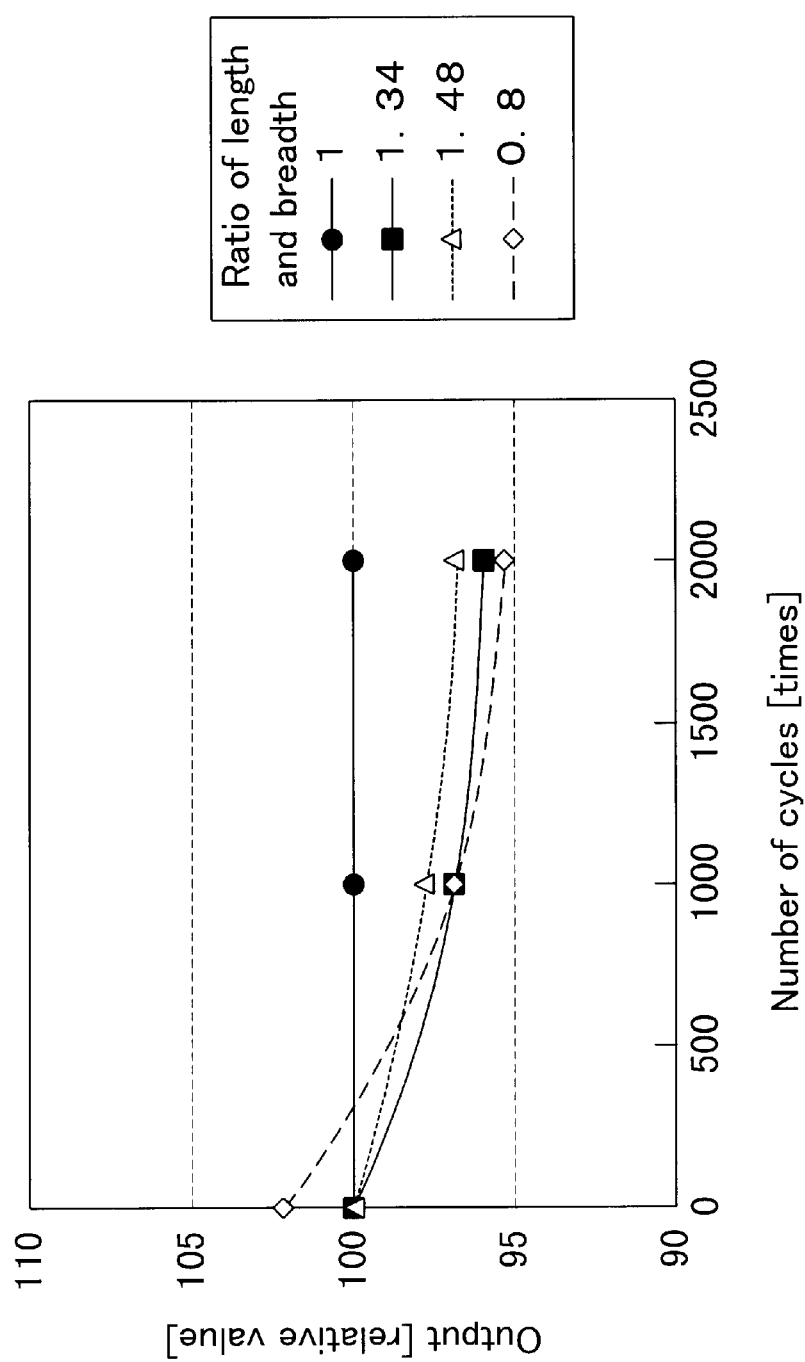
FIG. 4 is a graph showing how outputs of nickel metal-hydride secondary batteries that are manufactured by the manufacturing method of the present invention and a conventional manufacturing method change with respect to charge-discharge cycles.

Next, various positive electrodes having different ratios of length and breadth of the pores in the porous metal sheet were produced by a method similar to the above. The ratio of length and breadth of the pores was adjusted by changing pressure when producing the positive electrode sheet. Then, nickel metal-hydride secondary batteries were produced using the positive electrodes having various ratios of length and breadth of the pores. A hydrogen absorbing alloy electrode was used for the negative electrodes. A polypropylene nonwoven fabric was used for the separators. A mixed solution of KOH, NaOH and LiOH was used for the electrolytes. By a regular method, batteries with a rated capacity of 6.5 Ah were produced. With respect to the batteries obtained as above, cycle tests were conducted to measure the change of their output. One cycle test was constituted by a charging-discharging cycle of 2C—charging at 35° C., followed by 2C—discharging at 35° C. FIG. 4 shows the result of these measurements.

The ordinate axis of FIG. 4 indicates relative values of outputs of the nickel metal-hydride secondary batteries when the output of the nickel metal-hydride secondary battery using the positive electrode whose pores had a ratio of length and breadth of 1 is expressed by 100.

As becomes clear from FIG. 4, compared with the battery using the positive electrode whose pores had a ratio of length and breadth of 1, the battery using the positive electrode whose pores had a ratio of length and breadth of 0.8, 1.34 or 1.48 showed a considerable decrease in its output as the charging-discharging cycles proceeded. This showed that the use of the positive electrode whose pores had a ratio of length and breadth of close to 1 improved lifetime.

Figure 5:
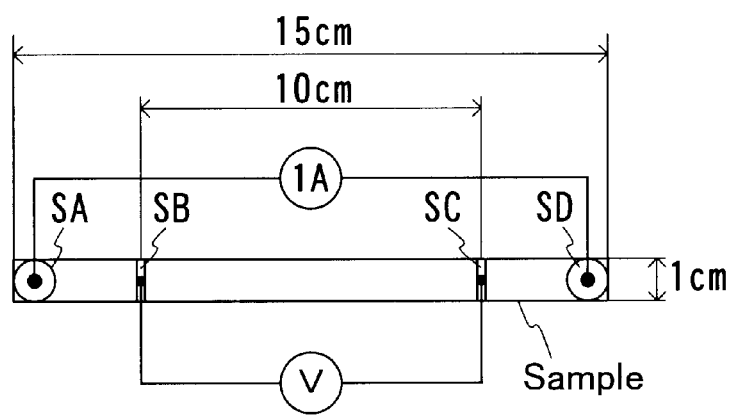
FIG. 5 shows how to measure the ratio of length and breadth of pores in the manufacturing method of the present invention.

In the following, the method for calculating the ratio of length and breadth of the pores in the porous metal sheet will be explained. First, a longitudinal sample whose longitudinal direction (direction B)×transverse direction (direction A) was 15 cm×1 cm and a transverse sample whose longitudinal direction×transverse direction was 1 cm×15 cm were cut out from the porous metal sheet 20. Next, the electrical resistance of each sample was measured. When measuring the electrical resistance, as shown in FIG. 5, electrode terminals SA and SD were provided at both ends of each sample, and electrode terminals SB and SC were provided at positions 2.5 cm closer to the center from the both ends. The distance between SB and SC was 10 cm. Then, when an electric current of 1 A was passed between the electrode terminals SA and SD, voltage between the electrode terminals SB and SC was measured, so as to calculate the electrical resistance. Thereafter, the ratio of the electrical resistance of the longitudinal sample to that of the transverse sample was calculated and regarded as the ratio of length and breadth of the pores. In this manner, the ratio of length and breadth of the pores was calculated. A similar method was adopted for calculating the ratio of length and breadth of the pores of other porous metal sheets.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for manufacturing a positive electrode for an alkaline storage battery comprising:

a first process of filling a paste of an active material for the positive electrode in a first porous metal sheet provided with a plurality of oblate pores whose major axes are arranged substantially in one direction; and a second process of pressing the first porous metal sheet that has undergone the first process using a roller press such that the one direction and a direction of a rotation axis of a roller in the roller press substantially are parallel, so as to produce a positive electrode sheet provided with a second porous metal sheet;

wherein, in the second porous metal sheet, a value obtained by dividing a length of the pores in the one direction by that of the pores in a direction perpendicular to the one direction and parallel to a surface of the second porous metal sheet averages in a range of 0.9 to 1.1.

2. The method according to claim 1, further comprising a preparatory process of producing the first porous metal sheet by pressing a porous metal sheet provided with a plurality of pores using a roller press before the first process.

3. The method according to claim 2, wherein, in the second process, the first porous metal sheet passes through the roller press after being rotated substantially by 90° around an axis perpendicular to a principal plane of the first porous metal sheet from a direction in which the porous metal sheet has passed through the roller press in the preparatory process.

4. The method according to claim 1, wherein the first porous metal sheet is formed of nickel.

5. The method according to claim 1, wherein the paste of the active material comprises nickel hydroxide.

* * * * *